United States Patent
Bowles et al.

(10) Patent No.: US 9,380,608 B1
(45) Date of Patent: Jun. 28, 2016

(54) ENHANCED EMERGENCY CALL MOBILITY SUPPORT

(75) Inventors: Kevin D. Bowles, Lenexa, KS (US); Robert H. Burcham, Overland Park, KS (US); Jason R. Delker, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 112 days.

(21) Appl. No.: 13/615,565

(22) Filed: Sep. 13, 2012

(51) Int. Cl.
*H04W 24/00* (2009.01)
*H04W 76/00* (2009.01)
*H04M 3/51* (2006.01)

(52) U.S. Cl.
CPC .......... *H04W 76/007* (2013.01); *H04M 3/5116* (2013.01)

(58) Field of Classification Search
CPC ..... H04W 4/22; H04W 76/007; H04W 12/06; H04M 2242/04; H04M 3/5116; H04M 3/42195; H04M 3/42042
USPC ................. 455/404.1, 415, 445, 521; 379/33, 379/38–49; 370/356, 397, 399, 409
See application file for complete search history.

(56) References Cited

U.S. PATENT DOCUMENTS

| | | | |
|---|---|---|---|
| 7,245,900 B1 | 7/2007 | Lamb et al. | |
| 7,702,081 B1 | 4/2010 | Klesper et al. | |
| 7,702,308 B2 | 4/2010 | Rollender | |
| 7,715,821 B2 | 5/2010 | Rollender | |
| 7,764,944 B2 | 7/2010 | Rollender | |
| 8,761,722 B1 | 6/2014 | Bowles et al. | |
| 2001/0021646 A1* | 9/2001 | Antonucci et al. | 455/404 |
| 2004/0198311 A1* | 10/2004 | Aerrabotu et al. | 455/404.1 |
| 2004/0203572 A1* | 10/2004 | Aerrabotu et al. | 455/404.1 |
| 2007/0066273 A1 | 3/2007 | Laroia et al. | |
| 2009/0063174 A1 | 3/2009 | Fricke | |
| 2010/0246780 A1 | 9/2010 | Bakker et al. | |
| 2011/0026687 A1* | 2/2011 | Smelyansky | 379/45 |
| 2012/0015622 A1 | 1/2012 | Kuz et al. | |
| 2013/0069802 A1 | 3/2013 | Foghel et al. | |

OTHER PUBLICATIONS

Kevin D. Bowles, et al., Patent Application entitled "Enhanced Location Data in Emergency Call Handling," filed Sep. 14, 2012, U.S. Appl. No. 13/616,958.
Restriction Requirement dated Nov. 4, 2013, U.S. Appl. No. 13/616,958, filed Sep. 14, 2012.
FAIPP Pre-Interview Communication dated Dec. 11, 2013, U.S. Appl. No. 13/616,958, filed Sep. 14, 2012.
Notice of Allowance dated Feb. 5, 2014, U.S. Appl. No. 13/616,958, filed Sep. 14, 2012.

* cited by examiner

Primary Examiner — Thai Vu

(57) ABSTRACT

A system for connecting a mobile emergency call to a public safety answering point (PSAP). The system comprises a processor, a non-transitory memory, and an application stored in the memory. When executed by the processor, the application receives an emergency call from a mobile station, wherein the mobile station is associated with a non-dialable number, in response to receiving the emergency call from the mobile station, associates a temporary dialable number to the mobile station, and promotes establishing a communication link between the mobile station and a public safety answering point and providing the temporary dialable number to the public safety answering point.

18 Claims, 6 Drawing Sheets

ENHANCED EMERGENCY CALL MOBILITY SUPPORT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Emergency calling involves a communication device dialing a short number to reach emergency help when an emergency is experienced. For example, in the United States '911' can be dialed by a communication device, and the telephone network is required by applicable regulations to connect that call to the appropriate public safety answering point (PSAP). Common carrier communication service providers need to comply with a variety of emergency calling regulations.

Mobile communication may involve a cell phone establishing a communication with one or more cell towers using a radio communication link, and the cell tower linking the call back through the wired communication network. As the cell phone moves, for example as a cell phone operated in a moving vehicle moves, a first cell tower may hand over the in-progress cellular call to a second cell tower that establishes a radio communication link with the cell phone. Cell phones may initiate emergency calls, and supporting the government regulations for emergency calls originating from cell phones poses some challenges not associated with wired and/or fixed location phones.

Communication radios are now being provided in devices other than the traditional cell phone. For example, communication radios may be placed in head units in motor vehicles. Communication radios may be placed in notebook computers used in an industrial control environment. Communication radios may be placed in wearable emergency communication devices. In some cases, these non-traditional devices may originate wireless emergency calls.

SUMMARY

In an embodiment, a system for connecting a mobile emergency call to a public safety answering point (PSAP) is disclosed. The system comprises a processor, a non-transitory memory, and an application stored in the memory. When executed by the processor, the application receives an emergency call from a mobile station, wherein the mobile station is associated with a non-dialable number, in response to receiving the emergency call from the mobile station, associates a temporary dialable number to the mobile station, and promotes establishing a communication link between the mobile station and a public safety answering point and providing the temporary dialable number to the public safety answering point.

In an embodiment, a method of connecting a mobile emergency call to a public safety answering point (PSAP) is disclosed. The method comprises receiving an emergency call from a mobile station, wherein the mobile station is associated with a non-dialable number and wherein the emergency call is directed to a routable number that references a network node in a service provider network, associating a temporary dialable number to the non-dialable number, in response to receiving the emergency call from the mobile station, establishing a communication link from the mobile station to a public safety answering point, and providing the temporary dialable number to the public safety answering point.

In an embodiment, a method of connecting a mobile emergency call to a public safety answering point (PSAP) is provided. The method comprises receiving an emergency call from a mobile station, wherein the mobile station is associated with a non-dialable number, wherein the emergency call is directed to a routable number that references a network node in a service provider network, and wherein the emergency call includes a location cue to the location of the mobile station. The method further comprises, based on the location cue, selecting a public safety answering point from among a plurality of public safety answering points and establishing a communication link from the mobile station to the selected public safety answering point.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
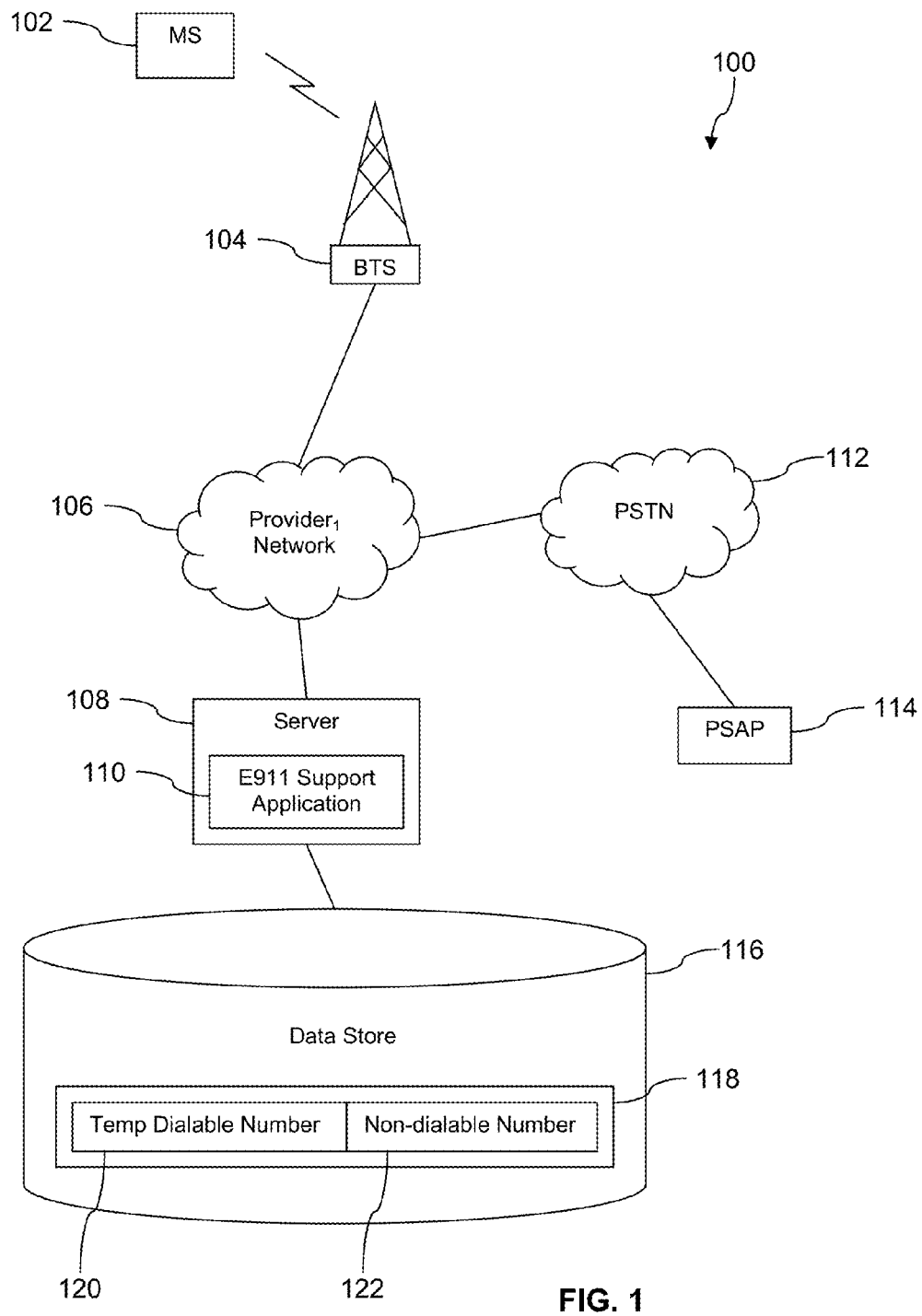
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Some electronic devices comprise a mobile communication device or mobile station that is assigned a non-dialable telephone number that is not generally routable. For example, the non-dialable telephone number may be a telephone number that has an area code that begins with '5.' Typically such non-dialable numbers may be used to communicate with the mobile station by the common carrier wireless service provider that provides a communication service subscription for the mobile station or otherwise has a proprietary relationship with the mobile station, but may not be suitable for use by other service providers. These mobile stations may engage in infrequent or limited kinds of communication that do not justify the allocation of the resources associated with a standard routable telephone number, which may be referred to in some contexts as a dialable telephone number. Examples of these electronic devices embedding a mobile station may include an electronic head unit installed in an automobile, a notebook computer used in an industrial control environment for commanding an industrial machine, and a wearable emergency radio.

When an emergency call, such as an E911 call, is placed by a mobile communication device to a public safety answering point (PSAP) it is preferable to provide a callback number to the public safety answering point in case the call drops. In this way, the public safety answering point can use the callback number to call the mobile communication device to continue to provide emergency assistance. If a mobile station that is associated with a non-dialable telephone number places an emergency E911 call, however, the public safety answering point may not be able to call back to the mobile station.

The present disclosure teaches ways to promote call back to a mobile station that is associated with a non-dialable telephone number. In an embodiment, a mobile station that is allocated a non-dialable number is configured to direct emergency calls to a number that routes to a network node in a common carrier service provider network. When the subject mobile station directs an emergency call to the network node, for example a server computer, the network node creates an association between the non-dialable number allocated to the subject device and a temporary dialable number that routes into the common carrier service provider network. For example, the server may create an entry in a data store that includes both the non-dialable number allocated to the subject device and the temporary dialable number, where the data store is searchable by the temporary dialable number. The server computer may select a public safety answering point (PSAP) that is deemed closest to the subject mobile station and promote the establishment of a communication link between the subject mobile station and the public safety answering service. For example, the server computer may delegate establishment of the communication link to a signaling node such as a call session control function (CSCF) platform. The server computer or call session control function platform may provide the temporary dialable number to the public safety answering service at the same time that it establishes the communication link between the subject mobile station and the public safety answering point.

In another embodiment, the mobile station places a normal emergency call, and programming in the service provider network detects that the emergency call is being placed by a mobile station associated with a non-dialable number. In response to detection of this scenario, the programming routes the emergency call to the server described above. The server associates the non-dialable number with a temporary dialable number and routes the call on to the public safety answering point along with the temporary dialable number as described above. This alternative embodiment may be useful when working with legacy mobile stations that are not configured to direct an emergency call to the telephone number associated with the server.

If the communication link is dropped, the public safety answering point may attempt to reconnect to the subject mobile station by calling the temporary dialable number. When the call to the temporary dialable number is handled by the common carrier service provider network, the entry in the data store is selected based on the temporary dialable number, the non-dialable number of the subject mobile station is obtained, and a communication link is established between the public safety answering service and the subject mobile station based on the non-dialable number. For example, a signaling node in the common carrier service provider network, such as a CSCF platform, establishes the communication link between the public safety answering service and the subject mobile station based on the non-dialable number.

In an embodiment, the mobile station provides an indication of its location in the emergency call message. It is contemplated that this indication of the location of the mobile station may take a variety of forms, as discussed further below. As an example, the indication of the location of the mobile station may comprise a cell sector identity of a cell sector of a cell tower or base transceiver station (BTS) that currently is providing wireless communication coverage to the mobile station. As is known to those skilled in the art, a cell sector identity identifies one of a plurality of antenna sectors of a specific cell tower. The server computer uses the indication of the location of the mobile station to select a public safety answering point that is responsible for handling the emergency call from among a plurality of public safety answering points. The responsible public safety answering point may be defined to be the public safety answering point that the mobile station is deemed closest to or defined according to another location dependent criteria. If the server computer is not able to determine the responsible public safety answering point based on the indication of the location of the mobile station or if the indication of location was not provided in the emergency call, the serving computer may simply route the emergency call to 911.

Turning now to FIG. 1, a communication system 100 is described. In an embodiment, the system 100 comprises a mobile station 102, a base transceiver station 104, a first communication service provider network 106, and a server 108. In an embodiment, the server 108 comprises an emergency call support application 110. The server 108 may be implemented as a computer system. Computer systems are discussed further hereinafter. In an embodiment, the server 108 is in communication with a data store 116 comprising data entries 118. In an embodiment, the data entries 118 may comprise an association between a temporary dialable number 120 and a non-dialable number 122. While in FIG. 1 the data store 116 is indicated as coupled to the first provider network 106 via the server 108, the data store 116 alternatively may be coupled to the first provider network 106 without passing through the sever 108, in which case the server 108 and the data store 116 may communicate with each other via the first provider network 106. The system 100 further comprises a public switched telephone network 112 and a public safety answering point 114. The system 100 supports emergency calling, for example E911 calling, as well as other communication services.

While the first provider network 106 and the public switched telephone network 112 are shown as separate network clouds in FIG. 1, one skilled in the art will appreciate that these could equally be abstracted as a single network cloud. The first provider network 106 may comprise any combination of private and/or public networks. The first provider network 106 and/or the public switched telephone network 112 may comprise any combination of data networks and/or voice networks. While a single public safety answering point 114 is illustrated in FIG. 1, it is understood that a plurality of public safety answering points are coupled to the public switched telephone network 112. While a single base transceiver station 104 is illustrated in FIG. 1, it is understood that the system 100 may comprise any number of additional base transceiver stations 104.

The mobile station 102 may be a variety of communication devices that share the common property that they are allocated a non-dialable telephone number. The mobile station 102 may be embedded in a head unit and/or telematics unit installed in a motor vehicle such as a car, a truck, or a boat. A head unit may comprise an intelligent processor that monitors some vehicle systems and presents information about the vehicle. The head unit may integrate a variety of functions comprising one or more of an audio system, a navigation system, a cellular communication system, a fuel consumption monitoring system, a maintenance schedule system, and other functions. The mobile station 102 may be embedded in a laptop computer, in a tablet computer, or in a notebook computer. In an embodiment, the laptop computer, tablet computer, or notebook computer may be used to control a machine or other process in an industrial environment. The mobile station 102 may be embedded in a wearable emergency radio, such as may be worn by an elderly person. The mobile station 102 may not be allocated a traditional dialable telephone number because the mobile station 102 may not yet have been initiated with a wireless communication service subscription or because the mobile station 102 may be intended for infrequent usage. The mobile station 102 may comprise a radio transceiver and may communicate with the base transceiver station 104 according to one or more of a code division multiple access (CDMA) wireless protocol, a global system for mobile communication (GSM) wireless protocol, a long-term evolution (LTE) wireless protocol, a worldwide interoperability for microwave access (WiMAX) wireless protocol, or another wireless protocol.

One skilled in the art appreciates what a non-dialable number is. A non-dialable number may be a number that is not generally routable, in contrast to a dialable number that is generally routable. Thus, a dialable number that routes to a specific telephone in a given common carrier service provider network can be called to from any other common carrier service provider network. As an example, non-dialable numbers may be ten digit numbers that begin with the number '5'. This kind of non-dialable number may be referred to in some contexts as '5yy' numbers. As an example, a non-dialable number may associate to a mobile station served by a first common carrier service provider network. If a device that is currently receiving communications connectivity from a second common carrier service provider network attempts to place a call to this non-dialable number, the second common carrier service provider network probably does not know how to route the call to the non-dialable number, e.g., does not know how to establish a series of communication links to connect the call to the mobile station 102 associated with the non-dialable number.

The mobile station 102 supports emergency calling. Thus, a user of the mobile station 102 may activate a control of the mobile station 102 that results in a call being placed to the public safety answering point 114 and the user being communicatively linked with an emergency dispatcher or other emergency assistance people. The user may invoke emergency calling by dialing '911'. Alternatively, the user may invoke emergency calling by another control input, for example selecting a special purpose button on a user interface of the mobile station 102 or the device into which the mobile station 102 is embedded. In an embodiment, software in a telematics unit may detect an emergency condition and automatically initiating an emergency call without any manual user input. For example, if the telematics unit detects that air bags of a vehicle have been deployed or that the vehicle orientation has suddenly changed in a way consistent with a spin and/or a roll-over, the telematics unit may automatically command the mobile station 102 to place an emergency call. In general, because the mobile station 102 is not associated with a dialable number, the public safety answering point 114 may not be able to call back to the mobile station 102 if the initial communication link that is established fails, but emergency calling regulations typically stipulate that the emergency calling infrastructure shall provide the ability for the public safety answering point 114 to call back to the mobile station 102 if the communication link fails.

In an embodiment, the mobile station 102 may be configured to map the emergency call control selection to place a call to a number that routes into the first provider network 106, more specifically to the server 108 and the emergency call support application 110. The mobile station 102 may be configured with this functionality and this number at the time of manufacture or, alternatively, via a configuration operation, for example a firmware-over-the-air update, after the mobile station 102 has been embedded into a larger system, such as a head-unit and/or telematics unit being installed and/or assembled into a motor vehicle. Alternatively, the mobile station 102 may place the emergency call to a normal emergency telephone number customarily associated with an E911 call, and a call processing node in the first provider network 106 may detect that the E911 call is being originated by a mobile communication device that is associated with a non-dialable number (e.g., the mobile station 102). The call processing node may then route the call from the mobile station 102 to the server 108.

When an emergency call origination message is received from the mobile station 102, the server 108 creates an entry 118 in the data store 116 that associates the non-dialable number 122 of the mobile station 102 with the temporary dialable number 120. The temporary dialable number 120 may be provisioned in the first provider network 106 to route to a signaling node in the first provider network 106, for example to a call session control function node in the first provider network 106. A plurality of temporary dialable numbers 120 may be held in reserve by the first provider network 106, and one temporary dialable number 120 may be taken out of reserve for unique association with the subject non-dialable number 122 when an emergency call origination message is received from the mobile station 102. At some later time, for example after the emergency call has been properly terminated, the entry 118 may be removed from the data store 116 and the temporary dialable number 120 may be recovered and returned to the reserve.

When a call to the temporary dialable number 120 is introduced into the first provider network 106, the temporary dialable number 120 is used to search for the entry 118 in the data store 116, and the non-dialable number 122 allocated to the mobile station 102 is obtained. The signaling node uses the non-dialable number 122 to establish a communication link to the mobile station 102. When the mobile station 102 calls into the server 108, for example when originating an emergency call, the server 108 creates the entry 118, selects a public safety answering point 114 for handling the emergency call, establishes a communication link or call between the mobile station 102 and the public safety answering point 114, and provides the temporary dialable number 120 to the public safety answering point 114 as the call-back number associated with the mobile station 102 and/or associated with the subject emergency call.

The mobile station 102 may provide an indication of its location in its emergency call origination message. It is contemplated that the indication of the location of the mobile station 102 may be provided in a number of different forms, as the situation permits and/or lends itself. The indication of the location of the mobile station 102 may comprise a cell sector identity of the cell sector of the base transceiver station 104 that currently is providing wireless coverage to the mobile station 102. As understood by those skilled in the art, a cell tower or a base transceiver station may have a plurality of directional antennas that provide wireless communication access coverage to a plurality of different sectors associated with the different antennas. For example, a first antenna group of the base transceiver station 104 may provide wireless communication access coverage to a first cell sector, a second antenna group of the base transceiver station 104 may provide wireless access coverage to a second cell sector, and a third antenna group of the base transceiver station 104 may provide wireless communication access coverage to a third cell sector. As an example, the mobile station 102 may receive wireless communication access coverage from the second cell sector of the base transceiver station 104, and the indication of its location provided by the mobile station 102 in the emergency call origination message may comprise the identity of the second cell sector of the base transceiver station 104. The identity of a cell sector may identify a specific cell sector of a specific base transceiver station 104 among all the cell sectors of all the base transceiver stations 104 of a given wireless communication service provider network.

In other embodiments, other indications of the location of the mobile station 102 may be provided in the emergency call origination message, for example satellite positioning system coordinates may be provided, such as global positioning system (GPS) coordinates or coordinates associated with a different satellite supported self-location system. In an embodiment, the mobile station 102 provides the identity of the base transceiver station 104 rather than the identity of a specific cell sector. It is contemplated that yet other indications of its location may be provided by the mobile station 102 in the emergency call origination message.

The emergency call support application 110 may use the indication of the location of the mobile station 102 to select an appropriate public safety answering point from a plurality of known public safety answering points. The application 110 may maintain a table or a map that associates each of a plurality of cell sector identities to a specific public safety answering point, for example the public safety answering point deemed closest to the subject cell sector coverage area. When the application 110 receives an emergency call origination message, the application 110 may use the cell sector identity carried in the message to map to the appropriate public safety answering point, for example to the telephone number of the public safety answering point 114. Alternatively, the application 110 may maintain a model of the serving domains of the public safety answering points, may analyze the cell sector identity to determine a location of the subject cell sector, and then find in which partition of the model the cell sector is located. A similar approach may be used to select a partition of the model based on coordinates of the mobile station 102 that may have been provided in the location information provided by the emergency call origination message. The application 110 may then route the call to the telephone number associated with the public safety answering point 114 that is associated with the subject partition of the model.

Figure 2:
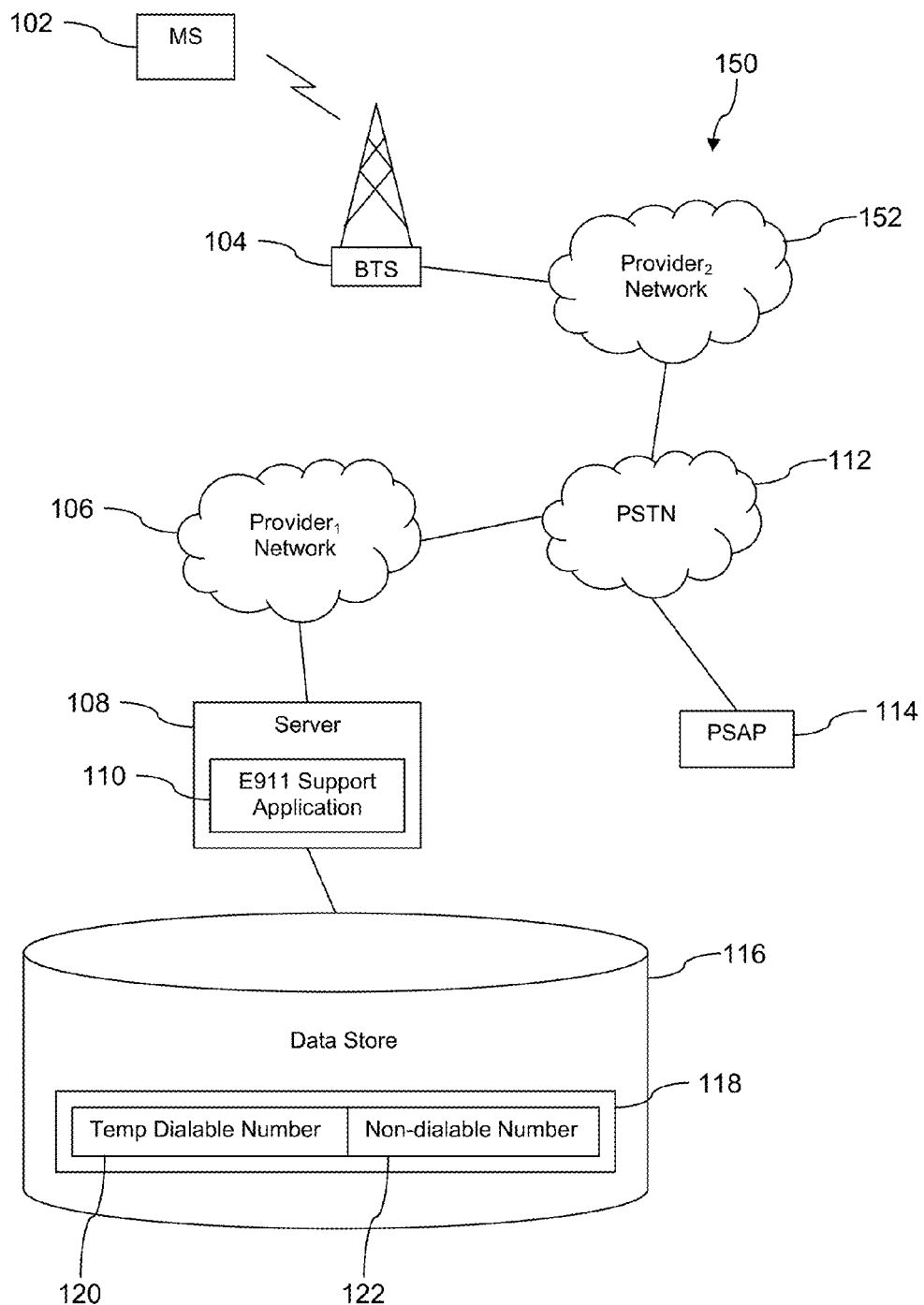
FIG. 2 is an illustration of another communication system according to an embodiment of the disclosure.

Turning now to FIG. 2, a communication system 150 is described. In an embodiment, communication system 150 is substantially similar to the communication system 100 described above, except that the base transceiver station 104 is coupled to a second communication service provider network 152, and the second communication service provider network 152 is coupled to the public switched telephone network 112. As would be appreciated by one skilled in the art, while the first provider network 106, the second provider network 152, and the public switched telephone network 112 are shown in FIG. 2 as separate network clouds, these could equally be abstracted as a single network cloud. FIG. 2 explicitly represents the situation of the mobile station 102 roaming out of network coverage provided by the first provider network 106 and into the network coverage provided by the second provider network 152, where the mobile station 102 may be allocated the non-dialable number 122 by the first provider network 106.

In an embodiment, the second provider network 152 does not know how to route the non-dialable number 122 allocated to the mobile station 102 by the first provider network 106. In other words, the second provider network 152 is not provisioned to route the non-dialable number 122 to the mobile station 102. When the mobile station 102 sends an emergency call origination message into the second provider network 152 via the base transceiver station 104, the message is routed by the second provider network 152 based on the number configured into the mobile station 102 that routes to the server 108 and/or the emergency call support application 110. The functionality provided by the server 108 and/or the application 110 then is substantially similar to that described above when the mobile station 102 is in the coverage provided by the first provider network 106.

When the public safety answering point 114 drops the communication link with the mobile station 102, it attempts to call back to the mobile station 102 using the temporary dialable number 120 provided by the server 108 on initial contact with the public safety answering point 114. The temporary dialable number 120 routes into the first provider network 106, for example to a signaling node such as a call session control function, and the non-dialable number 122 is accessed from the data store 116. The signaling node then works with the second provider network 152 to connect the public safety answering point 114 to the mobile station 102.

Figure 3:
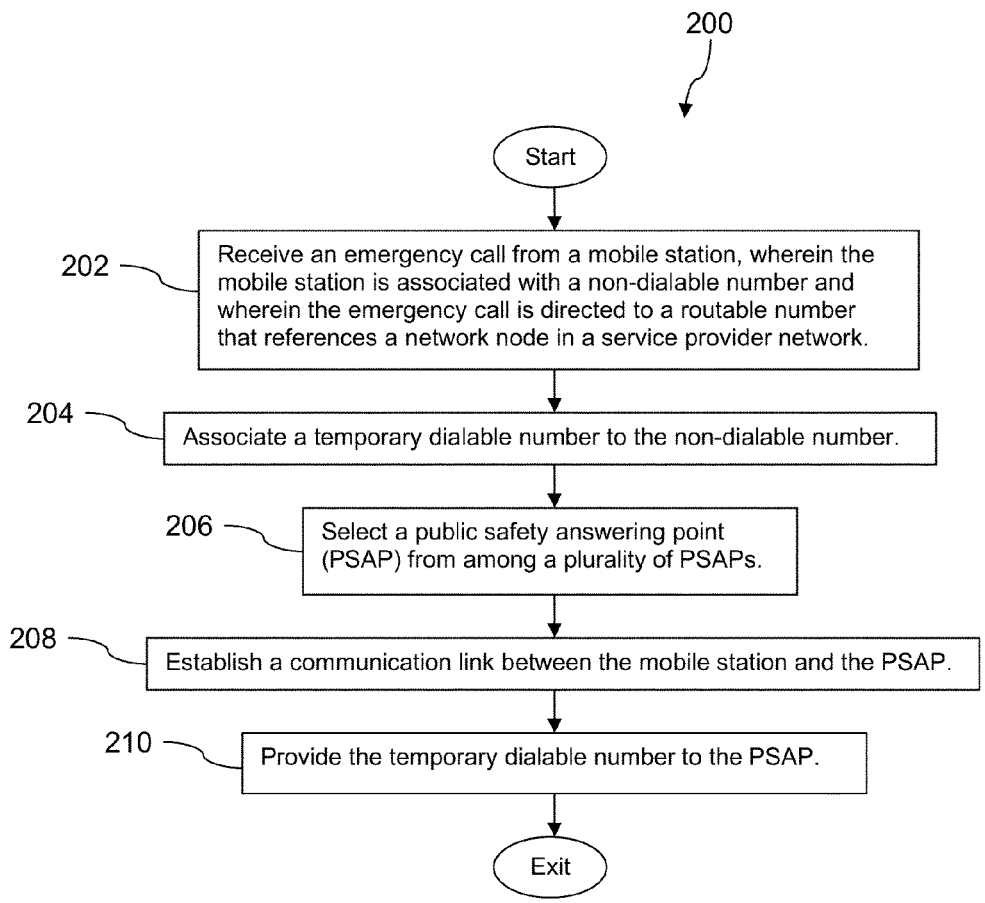
FIG. 3 is a flow chart of a method according to an embodiment of the disclosure.

Turning now to FIG. 3, a method 200 is described. At block 202, an emergency call is received from a mobile station, wherein the mobile station is associated with a non-dialable number and wherein the emergency call is directed to a routable number that references a network node in a service provider network. For example, an emergency call origination message is received from the mobile station 102 by the server 108 and/or the emergency call support application 110. The emergency call origination message may encapsulate an indication of the location of the mobile station 102. The emergency call origination message may be sent by the mobile station 102 to a number that is provisioned to route to the server 108 and/or the emergency call support application 110. The number may be configured into the mobile station 102, such that selection of a user interface control to trigger an emergency call results in sending the described emergency call origination message to the number configured into the mobile station 102. Alternatively, the emergency call may be directed to a customary emergency E911 number, and a call processing node in the service provider network may detect that the emergency call is being originated by a mobile station associated with a non-dialable number. The call processing node may then route the emergency call on to the server 108.

At block 204, a temporary dialable number is associated to the non-dialable number. For example, the emergency call support application 110 selects a specific temporary dialable number 120 from a reserve of temporary dialable numbers maintained by the first service provider network 106, marks the subject temporary dialable number 120 in the reserve as unavailable (because temporarily allocated to a specific association), and creates the entry 118 comprising the temporary dialable number 120 and the non-dialable number 122 in the data store 116.

At block 206, a public safety answering point 114 is selected from among a plurality of public safety answering points. For example, the emergency call support application 110 uses a cell sector identity or other indication of the location of the mobile station 102 provided in the emergency call origination message to select the public safety answering point 114. In some contexts this may be referred to as mapping the indication of the mobile station 102 to the public safety answering point 114. In some circumstances the location of the mobile station 102 may not map to a public safety answering point 114, and under this circumstance an emergency call may be placed by originating an E911 call on behalf of the mobile station 102. Alternatively, the mobile station 102 may be instructed to follow an alternative method where the mobile station 102 initiates an E911 call based on its non-dialable number or providing no call-back number.

At block 208, a communication link is established between the mobile station and the public safety answering point. For example, a signaling node such as a call session control function in the service provider network performs the call set-up operations to create an end-to-end communication link between the mobile station 102 and the public safety answering point 114. The signaling node may be triggered by a delegation operation or message from the server 108 in setting up the end-to-end communication link and may be provided with a variety of information for establishing the link from the server 108 and/or the emergency call support application 110. For example, the emergency call support application 110 may provide the temporary dialable number 120 to the signaling node for forwarding on to the public safety answering point 114. At block 210, the temporary dialable number 120 is provided to the public safety answering point 114.

Figure 4:
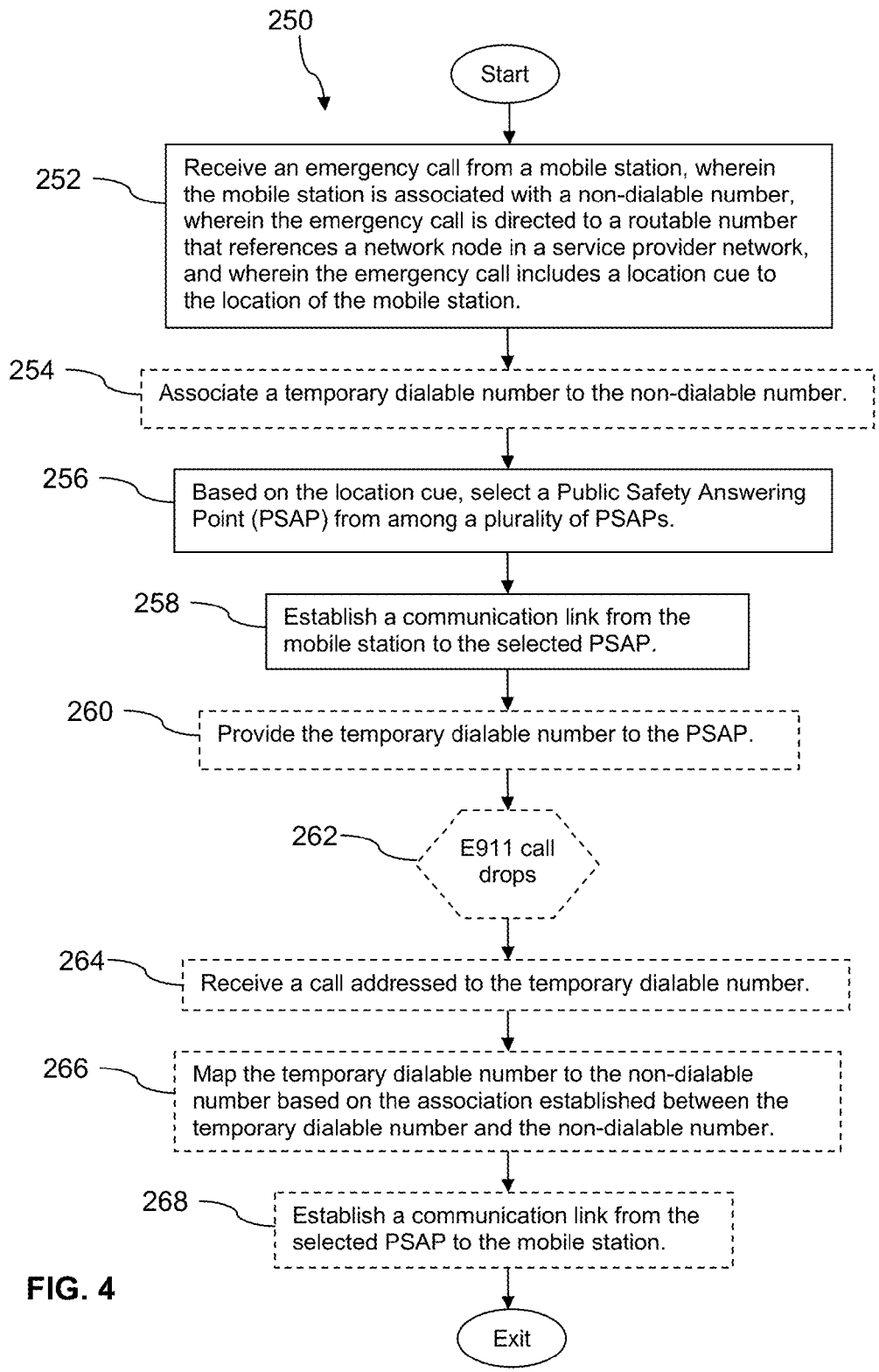
FIG. 4 is a flow chart of another method according to an embodiment of the disclosure.

Turning now to FIG. 4, a method 250 is described. At block 252, an emergency call is received from a mobile station 102, wherein the mobile station is associated with a non-dialable number, wherein the emergency call is directed to a routable number that references a network node in a service provider network, and wherein the emergency call includes a location cue to the location of the mobile station. The processing of block 250 may be substantially similar to the processing of block 202 described above with reference to FIG. 3. At block 254, optionally, a temporary dialable number is associated to the non-dialable number. For example, the temporary dialable number 120 is associated to the non-dialable number 122 in the entry 118 in the data store 116. At block 256, a public safety answering point 114 is selected based on the location cue provided in the emergency call. In some contexts this may be referred to as mapping the indication of the mobile station 102 to the public safety answering point 114. In some circumstances the location cue provided in the emergency call may not map to a public safety answering point 114, and under this circumstance an emergency call may be placed by originating an E911 call on behalf of the mobile station 102. Alternatively, the mobile station 102 may be instructed to follow an alternative method where the mobile station 102 initiates an E911 call based on its non-dialable number or providing no call-back number. At block 258, a communication link is established between the mobile station 102 and the emergency call answering point 114. For example, a call session control function platform establishes an end-to-end communication link between the mobile station 102 and the emergency call answering point 114.

At block 260, optionally, the temporary dialable number is provided to the public safety answering point 114. At block 262, optionally, after initial set-up of an end-to-end communication link between the mobile station 102 and the public safety answering point 114, the communication link may be broken. For example, the emergency call drops. At block 264, optionally, the temporary dialable number is mapped to the non-dialable number based on the association established between the temporarily dialable number and the non-dialable number in block 254. At block 268, optionally, establish a new communication link between the selected public safety answering point and the mobile station. For example, set-up a new end-to-end communication link between the public safety answering point 114 and the mobile station 102.

Figure 5:
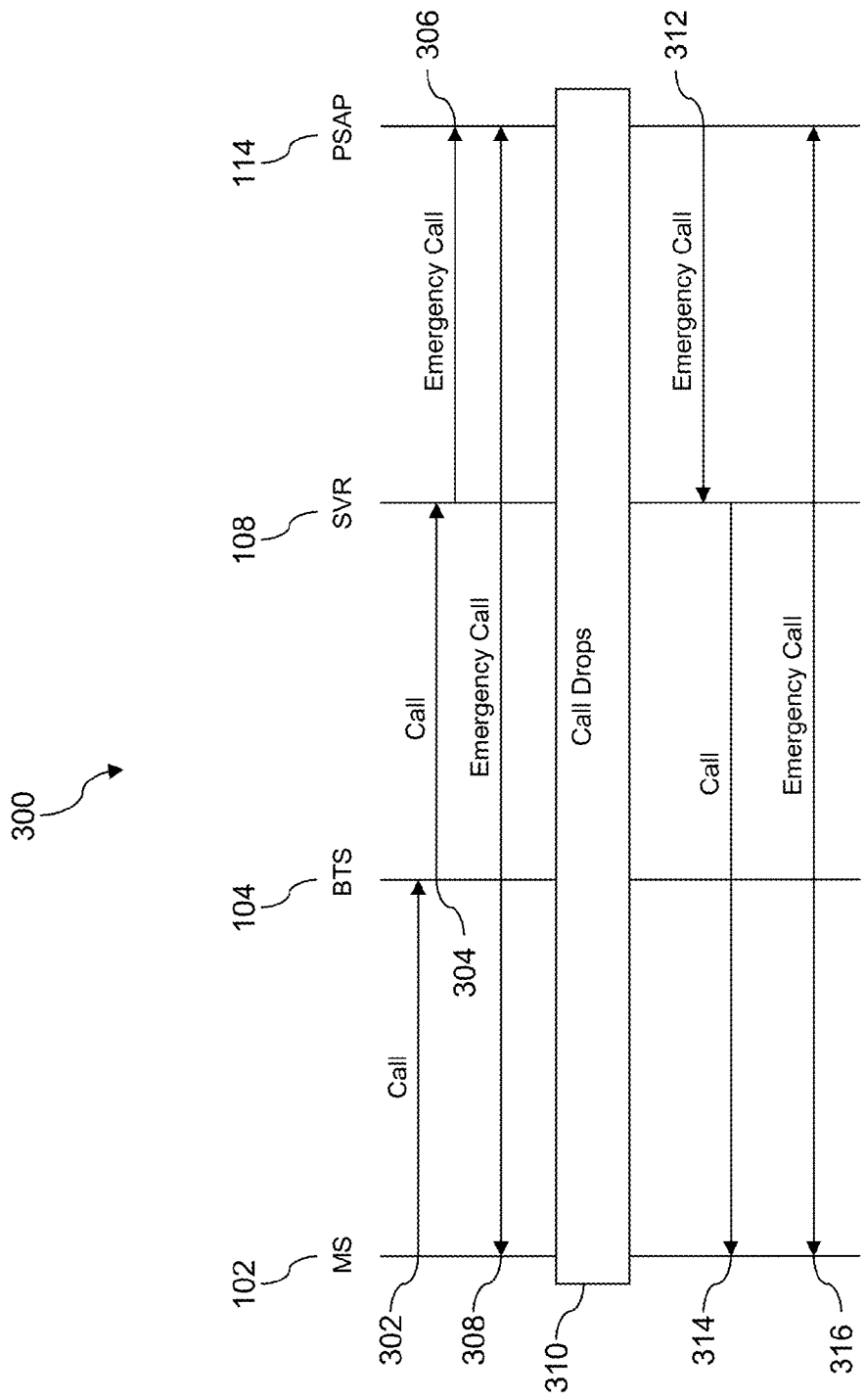
FIG. 5 is a message sequence diagram illustrating a call flow according to an embodiment of the disclosure.

Turning now to FIG. 5, a message sequence 300 is described. The call steps in message sequence 300 are consistent with the emergency call flow described above. The mobile station 102 initiates a call message 302 to the server 108 that is received by the base transceiver station 104 and routed as call message 304 on to the server 108 based on a phone number or short code in the call message 302. While the call may be initiated by a user of the mobile station 102 as an emergency call, for example by selecting a soft button on the mobile station 102 or selecting another control of the mobile station 102 to initiate an emergency call, the call messages 302, 304 may comprise normal public switched telephone network (PSTN) voice message call set-up messages.

The server 108 recognizes the call as an emergency call, determines an appropriate PSAP 114 for handling the emergency call, allocates a temporary dialable number 120 for the non-dialable number 122 in the data store 116, and connects the emergency call between the mobile station 102 and the PSAP 114. The server 108 also provides the PSAP 114 with the call-back number associated with the mobile station 102, which in this case is the temporary dialable number 120.

The call drops in block 310. The PSAP 114 dials back to the temporary dialable number 120 which routes to the server 108. The server 108 associates the temporary dialable number 120 to the non-dialable number 122 associated with the mobile station 102 by accessing the data store 116. The server 108 communicates 314 with the mobile station 102 based on the non-dialable number 122 and causes the mobile station 102 and the PSAP 114 again to connect via a voice channel. The message sequence 300 describes the set-up of a voice call from the mobile station 102 to PSAP 114 as a voice type of emergency call. There are a variety of differences of this emergency call model with the emergency call setup for voice over internet protocol (VoIP). For example, in VoIP there is no roaming construct: all VoIP nodes are inherently in the same unified network and their addresses are likewise inherently known and routable. In the case of the emergency call of a mobile station 102 having a non-dialable number associated to it and that must take account of the possibility of roaming into a network of a wireless service provider having no knowledge of the non-dialable number 120 associated to the mobile station 102, the methods and structures described above provide new solutions.

In the event that the mobile station 102 is not able to get an emergency call set up as described above, the mobile station 102 behavior is to default to standard E911. This circumstance may arise when the mobile station 102 is in a region of wireless coverage where the mobile station 102 has no roaming privileges. For example, the wireless service provider that provides wireless service to the mobile station 102 may not have a roaming agreement with a different wireless service provider who provides wireless coverage where the mobile station 102 is located at the time it attempts to initiate an emergency call to the server 108 as described above.

Figure 6:
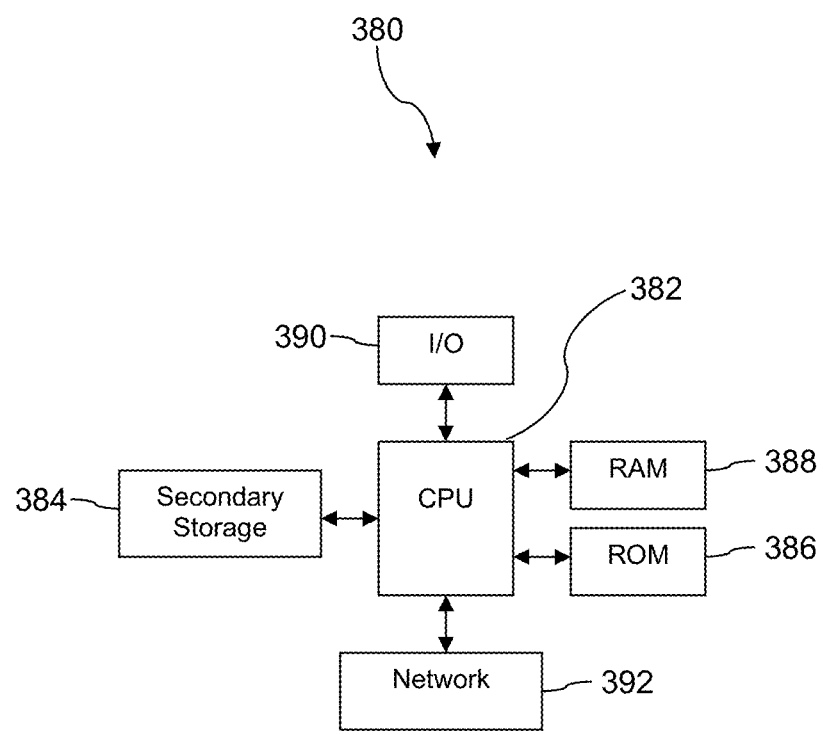
FIG. 6 is an illustration of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for connecting a mobile emergency call to a public safety answering point, comprising:
    a processor;
    a non-transitory memory; and
    an application stored in the memory that, when executed by the processor,
        receives an emergency call from a mobile station that originated from a roaming communication service provider network, wherein the mobile station is associated with a non-dialable number allocated by a home communication service provider network, and wherein the roaming communication service provider network routes the emergency call into the home communication service provider network based on a routable number to which the emergency call is directed that references a network node in the home communication service provider network,
        in response to receiving the emergency call from the mobile station in the roaming communication service provider network, associates, by the home communication service provider network, a temporary dialable number to the non-dialable number, and
    promotes establishing a communication link between the mobile station in the roaming communication service provider network and a public safety answering point and providing the temporary dialable number to the public safety answering point, wherein, when the public safety answering point drops the communication link with the mobile station, the public safety answering point reconnects to the mobile station by calling the temporary dialable number, and wherein the temporary dialable number routes into the home communication service provider network to a signaling node and the signaling node and the roaming communication service provider network work together to connect the public safety answering point to the mobile station.

2. The system of claim 1, wherein the mobile station is one of a head unit in a motor vehicle, a laptop computer, a tablet computer, or a wearable emergency radio.

3. The system of claim 1, wherein the non-dialable number is a ten digit number that begins with the digit '5'.

4. The system of claim 1, wherein the emergency call from the mobile station comprises a location cue that indicates a location of the mobile station, and wherein the application further selects the public safety answering point for which it promotes linkage to the mobile station from among a plurality of public safety answering points based on the location cue.

5. The system of claim 4, wherein the location cue is a cell sector identity, and wherein selecting the public safety answering point from a plurality of public safety answering points comprises mapping the location cue to the public safety answering point.

6. The system of claim 1, wherein the roaming communication service provider network is not provisioned to route the non-dialable number to the mobile station.

7. A method of connecting a mobile emergency call to a public safety answering point, comprising:

receiving an emergency call from a mobile station that originated from a roaming communication service provider network, wherein the mobile station is associated with a non-dialable number allocated by a home communication service provider network, and wherein the roaming communication service provider network routes the emergency call into the home communication service provider network based on a routable number to which the emergency call is directed that references a network node in the home communication service provider network;

associating, by the home communication service provider network, a temporary dialable number to the non-dialable number in response to receiving the emergency call from the mobile station in the roaming communication service provider network;

establishing a communication link from the mobile station in the roaming communication service provider network to a public safety answering point; and providing the temporary dialable number to the public safety answering point, wherein, when the public safety answering point drops the communication link with the mobile station, the public safety answering point reconnects to the mobile station by calling the temporary dialable number, and wherein the temporary dialable number routes into the home communication service provider network to a signaling node and the signaling node and the roaming communication service provider network work together to connect the public safety answering point to the mobile station.

8. The method of claim 7, wherein associating the temporary dialable number to the non-dialable number comprises creating an entry in a data store, where the entry comprises the temporary dialable number and the non-dialable number, where the data store is searchable by the temporary dialable number, and where the entry in the data store promotes the public safety answering point calling back to the mobile station in the event the established communication link breaks.

9. The method of claim 7, further comprising selecting the public safety answering point from among a plurality of public safety answering points.

10. The method of claim 9, wherein the public safety answering point is selected by mapping an indication of the location of the mobile station provided in the emergency call to the public safety answering point.

11. The method of claim 10, when the indication of the location of the mobile station does not map to a public safety answering point, responding to the emergency call by originating an E911 call on behalf of the mobile station.

12. The method of claim 10, wherein the indication of the location is a cell sector identity.

13. A method of connecting a mobile emergency call to a public safety answering point (PSAP), comprising:

receiving an emergency call from a mobile station that originated from a roaming communication service provider network, wherein the mobile station is associated with a non-dialable number allocated by a home communication service provider network, wherein the roaming communication service provider network routes the emergency call into the home communication service provider network based on a routable number to which the emergency call is directed that references a network node in the home communication service provider network, and wherein the emergency call includes a location cue to the location of the mobile station;

based on the location cue, selecting a public safety answering point from among a plurality of public safety answering points;

associating, by the home communication service provider network, a temporary dialable number to the non-dialable number; and establishing a communication link from the mobile station in the roaming communication service provider network to the selected public safety answering point and providing the temporary dialable number to the selected public safety answering point, wherein, when the selected public safety answering point drops the communication link with the mobile station, the selected public safety answering point reconnects to the mobile station by calling the temporary dialable number, and wherein the temporary dialable number routes into the home communication service provider network to a signaling node and the signaling node and the roaming communication service provider network work together to connect the selected public safety answering point to the mobile station.

14. The method of claim 13, further comprising:
receiving a call addressed to the temporary dialable number from the selected public safety answering point;
mapping the temporary dialable number to the non-dialable number based on the association established between the temporary dialable number and the non-dialable number; and
establishing a communication link from the selected public safety answering point to the mobile station.

15. The method of claim 13, wherein the location cue comprises a cell sector identity.

16. The method of claim 13, wherein the location cue comprises a satellite positioning system coordinate.

17. The method of claim 13, wherein the mobile station is one of a head unit in a motor vehicle, a laptop computer, a tablet computer, and a wearable emergency radio.

18. The method of claim 13, further comprising when the location cue does not associate to a public safety answering point, responding to the emergency call by originating an E911 call on behalf of the mobile station.

* * * * *